United States Patent
Shin et al.

(10) Patent No.: US 9,306,781 B2
(45) Date of Patent: Apr. 5, 2016

(54) APPARATUS AND METHOD FOR RECEIVING SIGNAL IN COMMUNICATION SYSTEM SUPPORTING GAUSSIAN FREQUENCY SHIFT KEYING MODULATION SCHEME

(71) Applicant: Samsung Electronics Co., Ltd., Gyeonggi-do (KR)

(72) Inventors: Myeong-Cheol Shin, Gyeonggi-do (KR); Tae-Sung Kim, Gyeonggi-do (KR); Jin-Yong Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/676,270

(22) Filed: Apr. 1, 2015

(65) Prior Publication Data

US 2015/0280951 A1 Oct. 1, 2015

Related U.S. Application Data

(60) Provisional application No. 61/973,619, filed on Apr. 1, 2014.

(30) Foreign Application Priority Data

Sep. 19, 2014 (KR) .......... 10-2014-0124929

(51) Int. Cl.
   *H04L 27/14* (2006.01)
(52) U.S. Cl.
   CPC .................................... *H04L 27/14* (2013.01)
(58) Field of Classification Search
   None
   See application file for complete search history.

(56) References Cited

U.S. PATENT DOCUMENTS

| | | | | |
|---|---|---|---|---|
| 6,763,074 B1* | 7/2004 | Yang | ......................... | H04L 1/22 375/232 |
| 7,017,104 B1* | 3/2006 | Chen | ......................... | H04L 1/20 375/235 |
| 7,298,798 B1* | 11/2007 | Chao | ................. | H04L 25/03292 341/143 |
| 7,415,078 B2* | 8/2008 | Smit | ................... | H04L 27/2332 329/300 |
| 7,515,665 B2* | 4/2009 | Yang | ................. | H04L 25/03127 375/229 |
| 8,069,401 B2* | 11/2011 | Pisek | .................... | H03M 13/41 714/778 |
| 2001/0017898 A1* | 8/2001 | Raheli | .................... | H04B 7/005 375/262 |
| 2002/0057746 A1* | 5/2002 | Chen | ................. | H04L 25/03178 375/334 |

(Continued)

FOREIGN PATENT DOCUMENTS

GB    EP 1901509 A1 * 3/2008 ........ H03M 13/3955

OTHER PUBLICATIONS

Lampe, L. et al., "Noncoherent sequence detection receiver for Bluetooth systems," Selected Areas in Communications, IEEE Journal on , vol. 23, No. 9, pp. 1718,1727, Sep. 2005.*

(Continued)

*Primary Examiner* — Daniel Washburn
*Assistant Examiner* — Berhanu Tadese
(74) *Attorney, Agent, or Firm* — The Farrell Law Firm, P.C.

(57) ABSTRACT

An apparatus and a method are provided for receiving a signal in a communication system supporting a Gaussian frequency shift keying (GFSK) modulation scheme. The method includes receiving the signal; and estimating a codeword vector by performing a signal detecting operation based on a GFSK-maximum likelihood sequence estimation (MLSE) scheme, which is based on a GFSK modulation scheme and an MLSE scheme, on the received signal. States of a Viterbi trellis that are used in the GFSK-MLSE scheme are determined based on the GFSK modulation scheme.

13 Claims, 11 Drawing Sheets

<COHERENT CASE>

<NON-COHERENT CASE>

(56) References Cited

U.S. PATENT DOCUMENTS

| | | | | |
|---|---|---|---|---|
| 2003/0128778 | A1* | 7/2003 | Hammes | H04L 25/03178 375/334 |
| 2004/0136480 | A1* | 7/2004 | Smit | H04L 27/233 375/350 |
| 2007/0268980 | A1* | 11/2007 | Brannstorm | H04B 7/0848 375/265 |
| 2008/0178063 | A1* | 7/2008 | Norris | H03M 13/41 714/786 |
| 2010/0309959 | A1* | 12/2010 | Lakkis | H04L 27/2007 375/150 |
| 2011/0142173 | A1* | 6/2011 | Peng | H04L 27/10 375/334 |

OTHER PUBLICATIONS

Tibenderana, C. et al., "Efficient and Robust Detection of GFSK Signals under Dispersive Channel, Modulation Index, and Carrier Frequency Offset Conditions," EURASIP Journal on Applied Signal Processing 2005.*

Tibenderana, C. et al., "A low-cost scalable matched filter bank receiver for GFSK signals with carrier frequency and modulation index offset compensation," Signals, Systems and Computers, IEEE, vol. 1, no., pp. 682,686 vol. 1, Nov. 7-10, 2004.*

Speth, M. et al., "MLSE based detection for GFSK signals with arbitrary modulation index," Communications, 2004 International Zurich Seminar on , vol., no., pp. 228,231, 2004.*

* cited by examiner

APPARATUS AND METHOD FOR RECEIVING SIGNAL IN COMMUNICATION SYSTEM SUPPORTING GAUSSIAN FREQUENCY SHIFT KEYING MODULATION SCHEME

PRIORITY

This application claims priority under 35 U.S.C. §119(a) to Korean Patent Application Serial No. 10-2014-0124929, which was filed in the Korean Intellectual Property Office on Sep. 19, 2014, and under 35 U.S.C. §119(e) to U.S. Provisional Patent Application Ser. No. 61/973,619, which was filed in the U.S. Patent and Trademark Office on Apr. 1, 2014, the contents of each of which are incorporated herein by reference.

BACKGROUND

1. Field of the Disclosure

The present disclosure relates generally to an apparatus and method for receiving a signal in a communication system supporting a Gaussian frequency shift keying (GFSK) modulation scheme, and more particularly, to an apparatus and method for receiving a signal based on a maximum likelihood sequence estimation (MLSE) scheme in a communication system supporting a GFSK modulation scheme.

2. Description of the Related Art

An MLSE scheme minimizes a probabilistic error of a received signal. The MLSE scheme is a signal detecting scheme which is suitable for a wireless channel environment, and therefore, may be used for enhancing total performance of a communication system.

However, in current communication systems supporting a GFSK modulation scheme, it is not considered that the MLSE scheme may be used to detect a received signal, when the GFSK modulation scheme is used.

Accordingly, there is a need for an apparatus and method for detecting a received signal using an MLSE scheme in a communication system using a GFSK modulation scheme.

SUMMARY

The present disclosure has been made to address at least the above-mentioned problems and/or disadvantages and to provide at least the advantages described below.

Accordingly, an aspect of the present disclosure is to provide an apparatus and method for receiving a signal in a communication system supporting a GFSK modulation scheme.

Another aspect of the present disclosure is to provide an apparatus and method for receiving a signal based on a GSFK-MLSE scheme, which is based on a GFSK modulation scheme and an MLSE scheme, in a communication system supporting the GFSK modulation scheme.

Another aspect of the present disclosure is to provide an apparatus and method for receiving a signal based on a GSFK-MLSE scheme, thereby decreasing processing complexity in a communication system supporting a GFSK modulation scheme.

Another aspect of the present disclosure is to provide an apparatus and method for receiving a signal based on a GSFK-MLSE scheme, thereby decreasing implementation complexity in a communication system supporting a GFSK modulation scheme.

Another aspect of the present disclosure is to provide an apparatus and method for receiving a signal based on a GSFK-MLSE scheme, thereby compensating for a frequency offset in a communication system supporting a GFSK modulation scheme.

Another aspect of the present disclosure is to provide an apparatus and method for receiving a signal based on a GSFK-MLSE scheme, thereby compensating for a modulation index offset in a communication system supporting a GFSK modulation scheme.

Another aspect of the present disclosure is to provide an apparatus and method for receiving a signal based on a GSFK-MLSE scheme, thereby enhancing an error estimation performance in a communication system supporting a GFSK modulation scheme.

In accordance with an aspect of the present disclosure, a method is provided for receiving a signal by an apparatus in a communication system supporting a Gaussian frequency shift keying (GFSK) modulation scheme. The method includes receiving the signal; and estimating a codeword vector by performing a signal detecting operation based on a GFSK-maximum likelihood sequence estimation (MLSE) scheme, which is based on a GFSK modulation scheme and an MLSE scheme, on the received signal. States of a Viterbi trellis that are used in the GFSK-MLSE scheme are determined based on the GFSK modulation scheme.

In accordance with another aspect of the present disclosure, an apparatus is provided for receiving a signal in a communication system supporting a Gaussian frequency shift keying (GFSK) modulation scheme. The apparatus includes a receiver configured to receive a signal, and a controller configured to estimate a codeword vector by performing a signal detecting operation based on a GFSK-maximum likelihood sequence estimation (MLSE) scheme, which is based on a GFSK modulation scheme and an MLSE scheme, on the received signal. States of a Viterbi trellis that are used in the GFSK-MLSE scheme are determined based on the GFSK modulation scheme.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
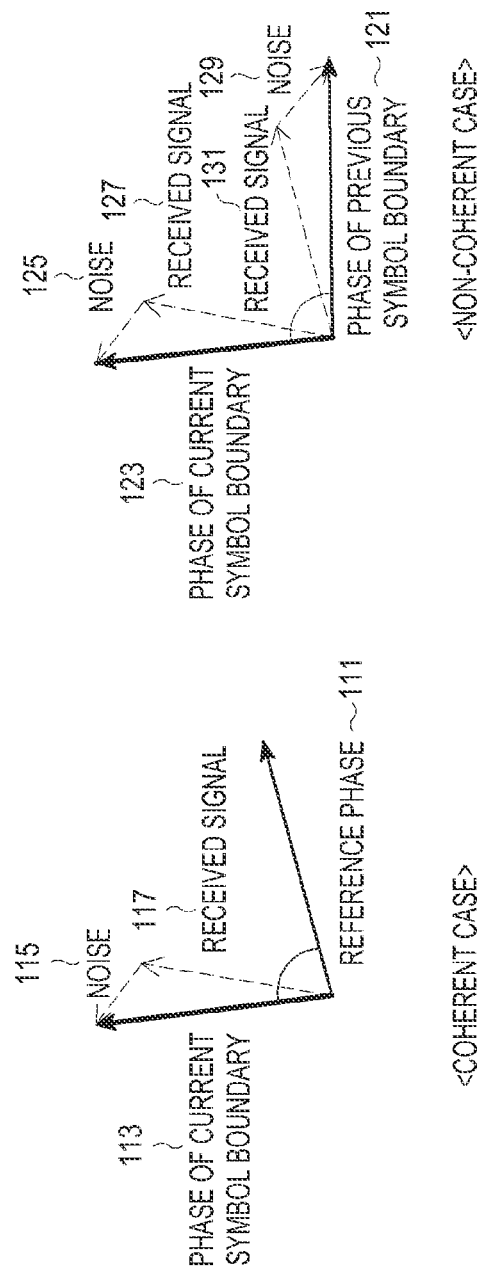
FIG. 1 illustrates performance degradation due to non-coherent demodulation in a communication system supporting a GFSK modulation scheme according to an embodiment of the present disclosure.

The following description, with reference to the accompanying drawings, is provided to assist in a comprehensive understanding of various embodiments of the present disclosure as defined by the claims and their equivalents. The description includes various specific details to assist in that understanding, but these details are to be regarded as merely exemplary. Accordingly, those of ordinary skill in the art will recognize that various changes and modifications of the various embodiments described herein can be made without departing from the scope and spirit of the present disclosure.

In addition, descriptions of well-known functions and constructions may be omitted for clarity and conciseness.

The following sets forth definitions of certain words and phrases used throughout this disclosure: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this disclosure; those of ordinary skill in the art should understand that in many, if not most instances, such definitions apply to prior, as well as future uses of such defined words and phrases.

Further, the terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth may be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), etc.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync®, Apple TV®, or Google TV®), a gaming console, an electronic dictionary, an electronic key, a camcorder, an electronic picture frame, etc.

According to various embodiments of the present disclosure, an electronic device may also be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, etc.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a signal receiving apparatus may be an electronic device.

Any method and/or apparatus described below in accordance with any embodiments of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, etc., and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile internet protocol (Mobile IP) system, etc.

In accordance with an embodiment of the present disclosure, a scheme is provided for receiving a signal based on a GFSK-MLSE scheme in a communication system supporting a GFSK modulation scheme. Further, in accordance with an embodiment of the present disclosure, a scheme is provided for receiving a signal based on a GFSK-MLSE scheme, thereby preventing performance degradation which may occur, e.g., performance degradation that occurs due to a non-coherent demodulation and ISI in a communication system supporting a GFSK modulation scheme.

FIG. 1 illustrates performance degradation due to non-coherent demodulation in a communication system supporting a GFSK modulation scheme according to an embodiment of the present disclosure.

Referring to FIG. 1, the GFSK modulation scheme has a non-linear characteristic. In the GFSK modulation scheme, if phase difference between a phase of a current symbol boundary and a phase of a previous symbol boundary has a positive value, a related symbol is detected as "1", and if the phase difference between the phase of the current symbol boundary and the phase of the previous symbol boundary has a negative value, the related symbol is detected as "−1".

In the coherent case, i.e., if a coherent demodulation scheme is used, a signal receiving apparatus knows information on a reference phase 111, which is used in a signal transmitting apparatus, and therefore, the signal receiving apparatus may detect a received signal based on phase difference between the reference phase 111 and a phase 113 of a current symbol boundary.

A channel environment between a signal receiving apparatus and a signal transmitting apparatus is an additive white Gaussian noise (AWGN) channel environment, and a received signal 117 including a signal that corresponds to the phase 113 of the current symbol boundary and a noise 115 may be received. In this case, the noise 115 included in a received signal of the current symbol boundary, i.e., the received signal 117, affects signal detection of the signal receiving apparatus.

However, in the non-coherent case, i.e., the signal receiving apparatus in FIG. 1 does not know the information on the reference phase 111 which is used in the signal transmitting apparatus, the signal receiving apparatus does not detect the received signal based on the phase difference between the reference phase 111 and the phase 113 of the current symbol boundary, but detects the received signal based on phase difference between a phase 121 of a previous boundary and the phase 113 of the current symbol boundary.

The channel environment between the signal receiving apparatus and the signal transmitting apparatus is the AWGN channel environment. Actually, a received signal 127, which includes a signal that corresponds to a phase 123 of a current symbol boundary, and a noise 125 are received, and a received signal 131, which includes a signal which corresponds to a phase 121 of a previous symbol boundary, and a noise 129 are received. In this case, the noise 125, which is included in the received signal of the current symbol boundary, i.e., the received signal 127, and the noise 129, which is included in the received signal of the previous symbol boundary, i.e., the received signal 131, both affect signal detection of the signal receiving apparatus.

Consequently, the signal receiving apparatus is affected twice by a noise upon detecting a related symbol, and may reflect a noise, which is amplified, as compared to an actual noise. That is, if the non-coherent demodulation scheme is used, performance of the GFSK modulation scheme may be degraded, thereby degrading performance of the communication system.

Figure 2:
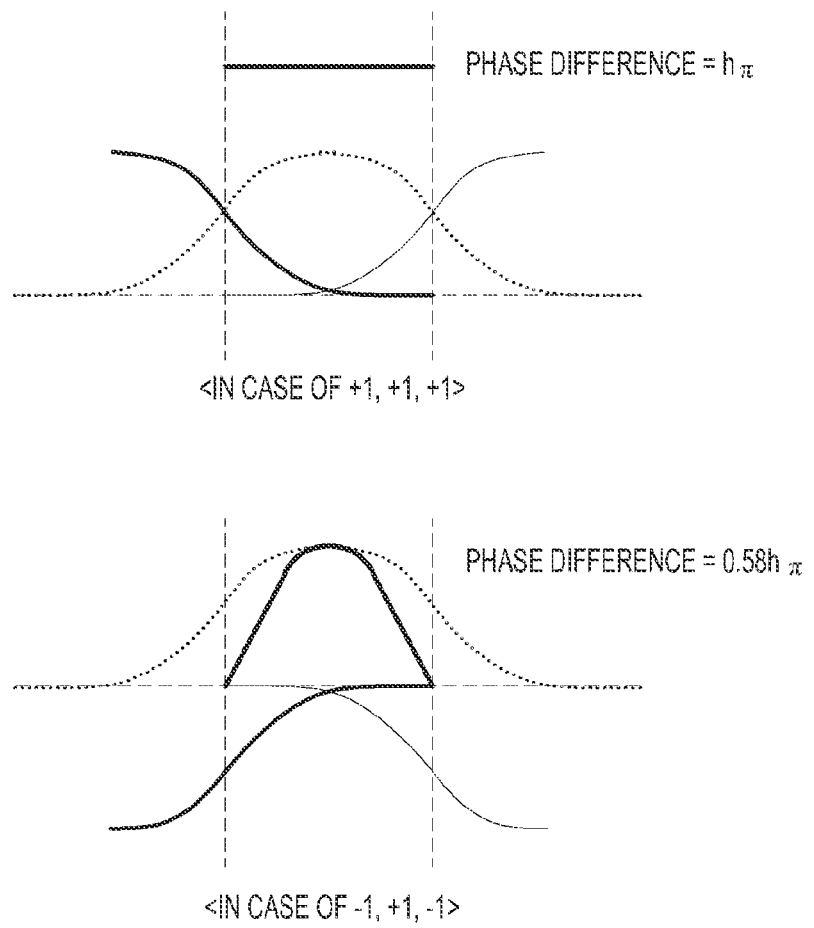
FIG. 2 illustrates performance degradation due to inter-symbol interference (ISI) in a communication system supporting a GFSK modulation scheme according to an embodiment of the present disclosure.

FIG. 2 illustrates performance degradation due to ISI in a communication system supporting a GFSK modulation scheme according to an embodiment of the present disclosure.

Referring to FIG. 2, if the GFSK modulation scheme is used, phase difference between a phase of a current symbol boundary and a phase of a previous symbol boundary may become small due to ISI. More specifically, if the GFSK modulation scheme is used, the greater the phase difference between the phase of the current symbol boundary and the phase of the previous symbol boundary is, the more exact signal a signal receiving apparatus may detect.

As illustrated in FIG. 2, if three continuous input information sequences are +1, +1, and +1, a sum of phase difference due to an overlap of a Gaussian pulse may be hπ. The phase difference hπ indicates the best performance of the GFSK modulation scheme, and is equal to a performance of a frequency shift keying (FSK) modulation scheme. Here, h denotes a modulation index which is used in the GFSK modulation scheme.

However, if the three continuous input information sequences are −1, +1, and −1, phase difference may be 0.58π. An error probability of a symbol that the phase difference of 0.58π occurs becomes higher than an error probability of a symbol that has the phase difference of hπ.

As described above, performance of a GFSK modulation scheme is degraded more than performance of a general FSK because there is an array in which phase difference between a phase of a current symbol boundary and a phase of a previous symbol boundary becomes small due to ISI.

Figure 3:
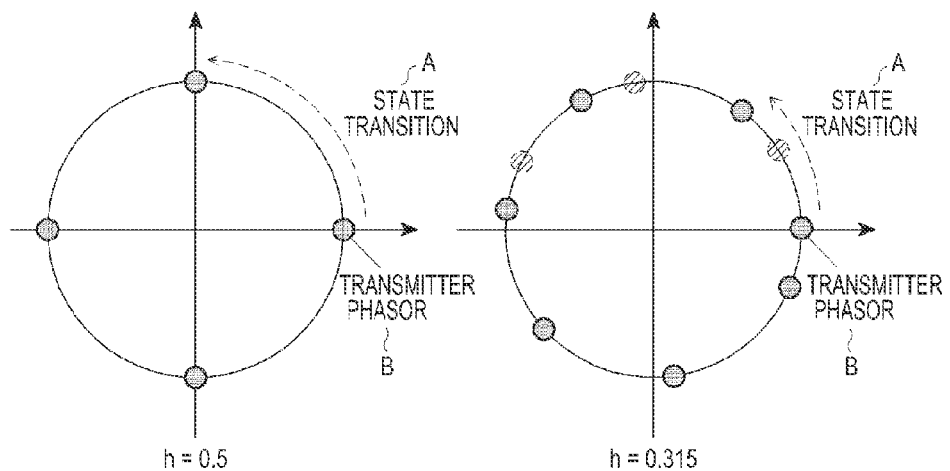
FIG. 3 illustrates a GFSK modulation scheme being used with an MLSE scheme in a communication system supporting the GFSK modulation scheme according to an embodiment of the present disclosure.

FIG. 3 illustrates a GFSK modulation scheme being used with an MLSE scheme in a communication system supporting a GFSK modulation scheme according to an embodiment of the present disclosure.

Referring to FIG. 3, in the MLSE scheme, which may decrease performance degradation due to ISI, a related symbol is detected by considering information of neighbor symbols, and the number of states that are used in the MLSE scheme is set to equal a number of phases that are used in the GFSK modulation scheme. In the MLSE scheme, an in-phase (I) signal and a quadrature (Q) signal are used as an input signal.

In the GFSK modulation scheme, a modulation index is used. If the GFSK modulation scheme is used with the MLSE scheme, the number of states that are used in the MLSE scheme is determined based on the modulation index that is used in the GFSK modulation scheme.

The modulation index that is used in the GFSK modulation scheme is expressed as "h" in FIG. 3. If a value of the modulation index that is used in the GFSK modulation scheme is 0.5, the number of states that are used in the MLSE scheme is four. That is, the number of phases that are supportable in the GFSK modulation scheme is identical to the number of states that are used in the MLSE scheme.

In the communication system supporting the GFSK modulation scheme, it is specified that a value of the modulation index that is used in the GFSK modulation scheme is generally set to an arbitrary value, which is in a preset range. For example, it is specified that a value within a range of 0.28 to 0.35 is used as the value of the modulation index, which is used in the GFSK modulation scheme in a Bluetooth® scheme.

As illustrated in FIG. 3, if the value of the modulation index that is used in the GFSK modulation scheme is 0.315 (h=0.315=63/200), the number of phases that are supportable in the GFSK modulation scheme is 400. In this case, the number of states that is used in an MLSE scheme is also 400, resulting in the MLSE scheme having an extremely complex processing. That is, the MLSE scheme is processed by considering 400 states, greatly increasing processing complexity.

Further, if a hardware device performs an MLSE scheme by considering the 400 states, the number of memories for storing variable values for the 400 states increases extremely increases. That is, hardware implementation complexity also increases.

Although not illustrated, in a communication system supporting a GFSK modulation scheme, if a frequency offset occurs, the number of states that are used in an MLSE scheme may also increase. This increase on the number of states also results in an increase of processing complexity and hardware implementation complexity.

In accordance with an embodiment of the present disclosure, an apparatus and a method are provided for receiving a signal based on a GFSK-MLSE scheme in consideration of the above-described situations, when a GFSK modulation scheme and an MLSE scheme are used, thereby preventing performance degradation due to non-coherent demodulation and ISI, and decreasing processing complexity and hardware complexity in a communication system supporting the GFSK modulation scheme.

Figure 4:
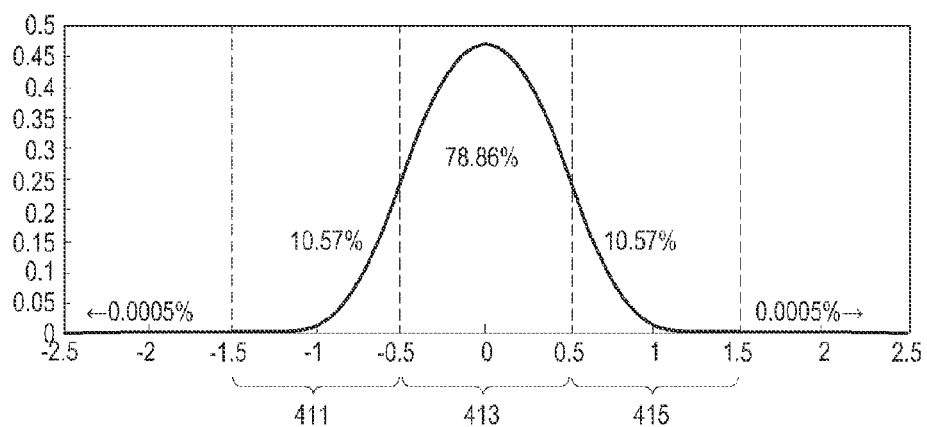
FIG. 4 is a graph illustrating a process of determining a number of states for use in a GFSK-MLSE scheme in a communication system supporting a GFSK modulation scheme according to an embodiment of the present disclosure.

FIG. 4 is a graph illustrating a process of determining a number of states for use in a GFSK-MLSE scheme in a communication system supporting a GFSK modulation scheme according to an embodiment of the present disclosure.

Referring to FIG. 4, the communication system supporting the GFSK modulation scheme specifies that a modulation index that is used in the GFSK modulation scheme is set to a value within a preset range, e.g., a range of 0.28 to 0.35. If the modulation index is set like this, the number of states that are used in an MLSE scheme sharply increases. Further, because the increase of the number of the states that are used in the MLSE scheme is directly related to the processing complexity of an MLSE scheme, the number of states that are used in a GFSK-MLSE scheme is determined as a preset number, e.g., 8 in an embodiment of the present disclosure.

The reasoning for determining the number of states that are used in the GFSK-MLSE scheme as 8 will be described below with reference to FIG. 4.

Even though a length of the Gaussian filter impulse response that is used in a GFSK modulation scheme is infinite, a signal detecting performance of the GFSK-MLSE scheme may be maintained if a symbol interval including total three symbols is considered. That is, as illustrated in FIG. 4, symbol energy that is greater than or equal to a preset threshold value is detected for total three symbols 411, 413, and 415, such that a signal is detected by considering a symbol interval including the three symbols in the GFSK-MLSE scheme.

In accordance with an embodiment of the present disclosure, all values that an input information array may have within a symbol interval of which symbol energy which is greater than or equal to a preset threshold value may be detected for a related symbol, e.g., a symbol interval including total three symbols, are determined as states by considering the symbol interval. The number of states that are used in the GFSK-MLSE scheme is determined as $2^3$ (=8).

For determining an error metric which is used in a GFSK-MLSE scheme, a Euclidean distance from an expected transmitter phase vector may be considered. Here, a transmitter denotes a signal transmitting apparatus.

However, transmitter phasor (phase vector) values are not fixed, so there is a need for calculating the transmitter phasor values using a sine function and a cosine function. If a signal receiving apparatus does not know a modulation index that is used in a signal transmitting apparatus, it is difficult, if not impossible, to predict the phasor values.

In accordance with an embodiment of the present disclosure, in order to determine an error metric that is used in the GFSK-MLSE scheme, another parameter, other than the Euclidian distance, will be considered. For example, in accordance with an embodiment of the present disclosure, in order to determine the error metric that is used in the GFSK-MLSE scheme, an absolute value of a phase deviation will be used.

The absolute value of the phase deviation may be expressed as shown in Equation (1).

$$|y_k - \hat{x}_k| \quad (1)$$

In Equation (1), $y_k$ denotes a phase deviation between a start timing point and an end timing point of a symbol k received by a signal receiving apparatus, $x_k$ denotes a phase deviation between a start timing point and an end timing point of a symbol k transmitted by a signal transmitting apparatus transmits, and $\hat{x}_k$ denotes a phase deviation between a start timing point and an end timing point of a symbol k estimated by the signal receiving apparatus.

Figure 5:
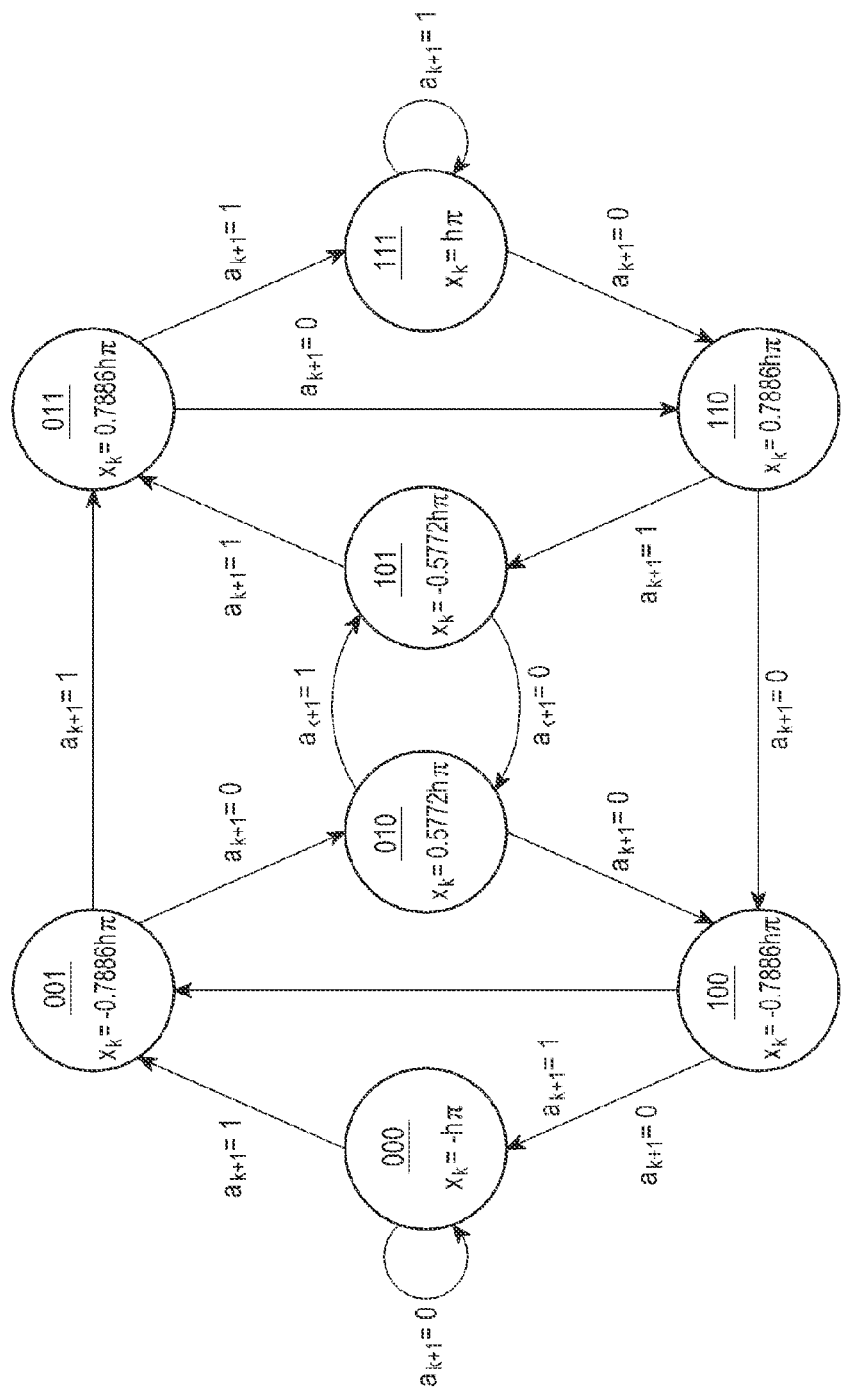
FIG. 5 illustrates a virtual state diagram for a transmission signal in a GFSK-MLSE scheme in a communication system supporting a GFSK modulation scheme according to an embodiment of the present disclosure.

FIG. 5 illustrates a virtual state diagram for a transmission signal in a GFSK-MLSE scheme in a communication system supporting a GFSK modulation scheme according to an embodiment of the present disclosure.

Referring to FIG. 5, the number of states of a Viterbi trellis is determined as $8(=2^3)$ by considering a symbol sequence including three information symbols that are lastly transmitted, e.g. a symbol sequence $a_{k-1}$ $a_k$ $a_{k+1}$. Assuming that a transmission signal, i.e., a transmitting phase deviation, is $x_k$, the transmitting phase deviation $x_k$ may be expressed as shown in Equation (2).

$$x_k \pm 0.1057h\pi \pm 0.7886h\pi \pm 0.1057h\pi \quad (2)$$

In Equation (2), h denotes a modulation index, $\pm 0.1057h\pi$, which is the first term included in the transmitting phase deviation $x_k$, denotes ISI from a previous information symbol, i.e., $a_{k-1}$, and $\pm 0.1057h\pi$, which is the last term included in the transmitting phase deviation $x_k$, denotes ISI from the next information symbol, i.e., $a_{k+1}$.

In a virtual state diagram for the transmitting phase deviation $x_k$, as expressed in Equation (2), a total of 8 states, i.e., 000, 001, 010, 011, 100, 101, 110, and 111 are considered, as illustrated in FIG. 5.

Figure 6:
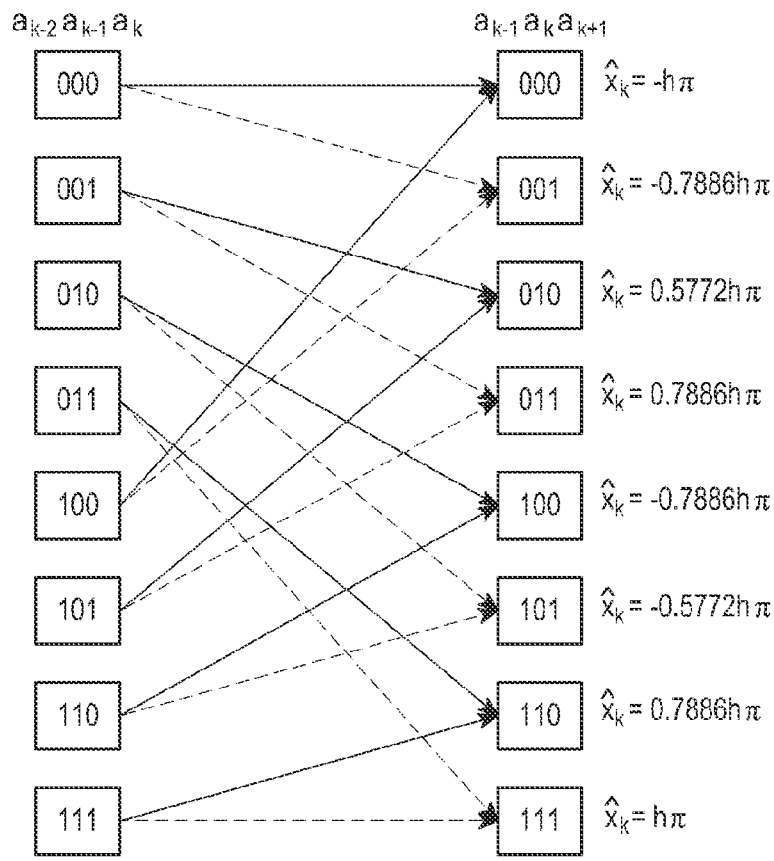
FIG. 6 illustrates a Viterbi trellis for a received signal in a GFSK-MLSE scheme in a communication system supporting a GFSK modulation scheme according to an embodiment of the present disclosure.

FIG. 6 illustrates a Viterbi trellis for a received signal in a GFSK-MLSE scheme in a communication system supporting a GFSK modulation scheme according to an embodiment of the present disclosure.

Referring to FIG. 6, the received signal is a Viterbi trellis, wherein a transmitting phase deviation is expressed as shown in Equation (2). In accordance with an embodiment of the present disclosure, the number of states of a Viterbi trellis is determined as $8(=2^3)$ by considering three information symbols that are lastly transmitted, i.e., a symbol sequence $a_{k-1}$ $a_k$ $a_{k+1}$. Accordingly, a transmitting phase deviation $\hat{x}_k$, which is estimated for the transmitting phase deviation $x_k$, is one of $-h\pi$, $-0.7886$ $h\pi$, $0.5772$ $h\pi$, $-0.5772$ $h\pi$, $0.7886$ $h\pi$, and $h\pi$, as illustrated as FIG. 6. Therefore, a transmitting phase deviation including ISI is used when a Viterbi trellis of an MLSE scheme is generated, in order to compensate for performance degradation due to ISI of a GFSK modulation scheme.

Figure 7:
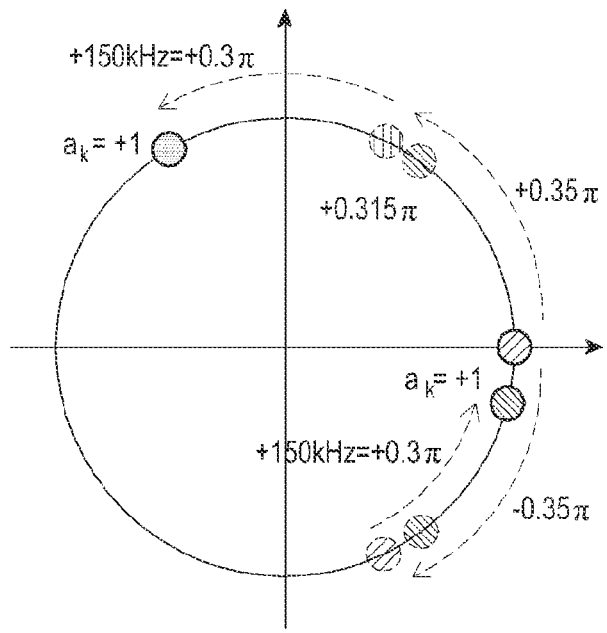
FIG. 7 illustrates an effect of a frequency offset and a modulation index offset in a GFSK-MLSE scheme in a communication system supporting a GFSK modulation scheme according to an embodiment of the present disclosure.

FIG. 7 illustrates an effect of a frequency offset and a modulation index offset in a GFSK-MLSE scheme in a communication system supporting a GFSK modulation scheme according to an embodiment of the present disclosure.

Referring to FIG. 7, if a Bluetooth® scheme is used in the communication system, a frequency offset of 75 kHz is permitted in a BR mode of the Bluetooth® scheme. Accordingly, if the Bluetooth® scheme is used, a frequency offset of 150 kHz (a transmitting side: ±75 kHz, a receiving side: ±75 kHz) may occur in the worst case. The frequency offset very slowly changes compared to a symbol length, and therefore, it may be regarded that the frequency offset maintains the same value during a preset interval.

In the BR mode of the Bluetooth® scheme, a range of a modulation index is set to 0.28 to 0.35. If BLE is used, a range of a modulation index is set to 0.45 to 0.55. A direction that the modulation index affects a related symbol may change according to a value of a symbol phase.

In the Bluetooth® scheme, it will be assumed that a non-coherent modulation scheme is used, so a signal receiving apparatus may not know information on a modulation index which is used in a signal transmitting apparatus.

A phase that may be detected for a related symbol, e.g., an information symbol $a_k$, when a frequency offset of 75 kHz and a modulation index of 0.35 are considered, is illustrated in FIG. 7.

As illustrated in FIG. 7, a probability that a symbol phase may be erroneously detected according to a frequency offset and a modulation index offset is very high. Therefore, in accordance with an embodiment of the present disclosure, a signal model is designed by considering a frequency offset and a modulation index offset, as will be described below.

A transmitting phase deviation $\hat{x}_k$, which is estimated for transmitting phase deviation $x_k$, may be modeled as shown in Equation (3).

$$\hat{x}_k = c_s(h_{fix} + h_d)\pi + f_d \quad (3)$$

In Equation (3), $c_s$ denotes a constant, which is dependent on ISI. For example, $c_s$ may be one of $\{-1, -0.7886, -0.5772, 0.5772, 0.7886, 1\}$. In Equation (3), $h_{fix}$ denotes a nominal fixed modulation index. For example, $h_{fix}$ may be 0.315. In Equation (3), $h_d$ denotes a modulation index offset, and $f_d$ denotes a frequency offset.

A receiving phase deviation $y_k$ may be modeled as shown in Equation (4).

$$y_k = \hat{x}_k + (n^k - n_{k-1}) \quad (4)$$

In Equation (4), $n_k - n_{k-1}$ denotes a phase term of a channel noise.

Figure 8:
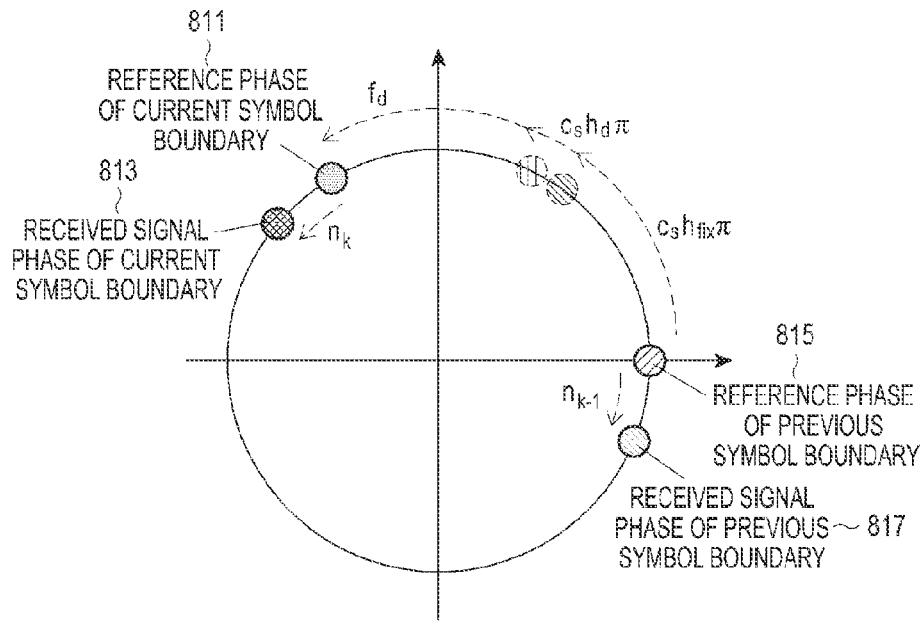
FIG. 8 illustrates a phase of a received signal in consideration of a frequency offset and a modulation index offset in a GFSK-MLSE scheme in a communication system supporting a GFSK modulation scheme according to an embodiment of the present disclosure.

FIG. 8 illustrates a phase of a received signal in consideration of a frequency offset and a modulation index offset in a GFSK-MLSE scheme in a communication system supporting a GFSK modulation scheme according to an embodiment of the present disclosure.

Referring to FIG. 8, a phase of a received signal in FIG. 8 denotes a phase of a received signal when an estimated transmitting phase deviation $\hat{x}_k$, as shown in Equation (3), and a receiving phase deviation $y_k$, as shown in Equation (4), are considered.

In FIG. 8, a reference sign 811 denotes a reference phase of a current symbol boundary. A received signal phase 813 of the current symbol boundary includes the reference phase 811 of the current symbol boundary and a noise.

The received signal phase 813 of the current symbol boundary is determined based on a reference phase 815 of a previous symbol boundary and a received signal phase 817 of the previous symbol boundary as expressed in Equation (3).

Figure 9:
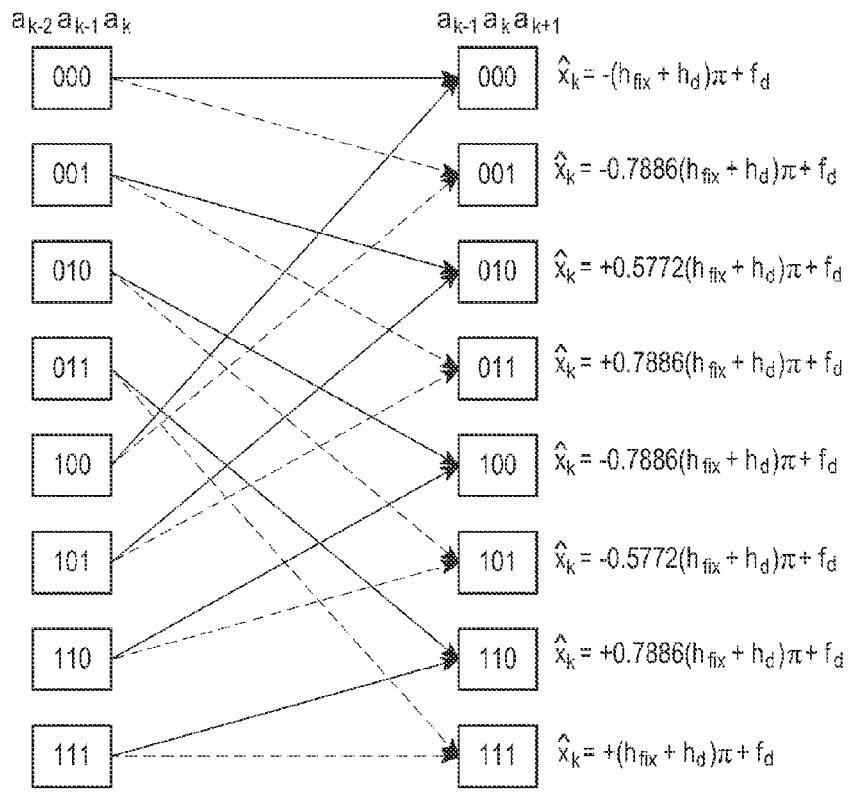
FIG. 9 schematically illustrates a Viterbi trellis for a received signal in consideration of a frequency offset and a modulation index offset in a GFSK-MLSE scheme in a communication system supporting a GFSK modulation scheme according to an embodiment of the present disclosure.

FIG. 9 illustrates a Viterbi trellis for a received signal in consideration of a frequency offset and a modulation index offset in a GFSK-MLSE scheme in a communication system supporting a GFSK modulation scheme according to an embodiment of the present disclosure.

Referring to FIG. 9, a received signal is a Viterbi trellis, wherein an estimated transmitting phase deviation $\hat{x}_k$ is expressed as shown in Equation (3), and a receiving phase deviation $y_k$ is expressed as shown in Equation (4).

In accordance with an embodiment of the present disclosure, the number of states of the Viterbi trellis is again determined as 8 (=$2^3$) based on three information symbols which are lastly transmitted, i.e., a symbol sequence $a_{k-1}\ a_k\ a_{k+1}$. Therefore, a transmitting phase deviation $\hat{x}_k$, which is estimated for a transmitting phase deviation $x_k$, may be one of $-(h_{fix}+h_d)\pi+f_d$, $-0.7886\ (h_{fix}+h_d)\pi+f_d$, $0.5772\ (h_{fix}+h_d)\pi+f_d$, $-0.5772\ (h_{fix}+h_d)\pi+f_d$, $0.7886\ (h_{fix}+h_d)\pi+f_d$, $(h_{fix}+h_d)\pi+f_d$, as illustrated in FIG. 9.

Figure 10:
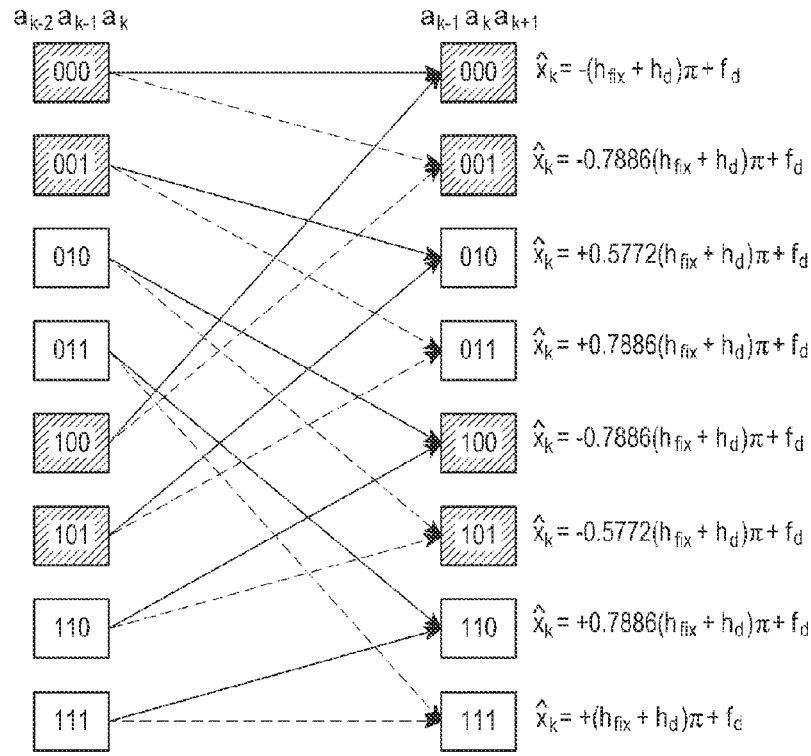
FIG. 10 illustrates a process of compensating for a frequency offset and a modulation index offset in a GFSK-MLSE scheme in a communication system supporting a GFSK modulation scheme according to an embodiment of the present disclosure.

FIG. 10 illustrates a process of compensating for a frequency offset and a modulation index offset in a GFSK-MLSE scheme in a communication system supporting a GFSK modulation scheme according to an embodiment of the present disclosure.

Referring to FIG. 10, a frequency offset changes slowly compared to a symbol length. As such, it may be regarded that the frequency offset maintains the same value during a preset interval, which may be expressed using Equations (5) and (6).

$$\hat{f}_{d+} \cong 0.7886 h_d \pi + f_d \qquad (5)$$

In Equation (5), $\hat{f}_{d+}$ denotes an estimation value of a sum of a frequency offset and a modulation index offset in a state that positive phase difference occurs. For convenience, the estimation value of the sum of the frequency offset and the modulation index offset in the state that the positive phase difference occurs will be called a 'positive offset estimation value'. In Equation (5), 0.7886 is a constant, which is proposed in an accordance with an embodiment of the present disclosure, and may be changed to other value.

$$\hat{f}_{d-} \cong -0.7886 h_d \pi + f_d \qquad (6)$$

In Equation (6), $\hat{f}_{d-}$ denotes an estimation value of difference between a frequency offset and a modulation index offset in a state that negative phase difference occurs. For convenience, the estimation value of the difference between the frequency offset and the modulation index offset in the state that the positive phase difference occurs will be called a 'negative offset estimation value'. In Equation (6), 0.7886 is a constant, which is proposed in an accordance with an embodiment of the present disclosure, and may be changed to other value.

As illustrated in FIG. 10, variables in each Viterbi state are updated, as will be described below.

In states in which a negative phase difference occurs, i.e., states in which $a_k$ is 0 ($a_k$=0), a negative offset estimation value may be updated as shown in Equation (7), and update for a positive offset estimation value is not performed.

$$\hat{f}_{d-,k} = \beta(y_k - \hat{x}_k) + (1-\beta)\hat{f}_{d-,k-1} \qquad (7)$$

In Equation (7), $\beta$ denotes a convergence factor. For example, the convergence factor $\beta$ is $\frac{1}{32}$. Equation (7) is an example of a method of estimating an offset, however, it will be understood by those of ordinary skill in the art that other offset estimating methods may be used.

In states in which a positive phase difference occurs, i.e., states in which $a_k$ is 1 ($a_k$=1), a positive offset estimation value may be updated as shown in Equation (8), and update for a negative offset estimation value is not performed.

$$\hat{f}_{d+,k} = \beta(y_k - \hat{x}_k) + (1-\beta)\hat{f}_{d+,k-1} \qquad (8)$$

In Equation (8), $\beta$ denotes a convergence factor. For example, the convergence factor $\beta$ is $\frac{1}{32}$. Equation (8) is an example of a method of estimating an offset, however, it will be understood by those of ordinary skill in the art that other offset estimating methods may be used.

A frequency offset and a modulation index offset in each Viterbi state are compensated, as will be described below.

In states in which $a_k$ is 0 ($a_k$=0), a frequency offset and a modulation index offset may be compensated by setting a branch metric as shown in Equation (9).

$$\text{Branch Metric} = |y_k - \hat{x}_k| = |y_k - c_s h_{fix}\pi - \hat{f}_{d-,k-1}| \qquad (9)$$

In states in which $a_k$ is 1 ($a_k$=1), a frequency offset and a modulation index offset may be compensated by setting a branch metric as shown in Equation (10).

$$\text{Branch Metric} = |y_k - \hat{x}_k| = |y_k - c_s h_{fix}\pi - \hat{f}_{d+,k-1}| \qquad (10)$$

Figure 11:
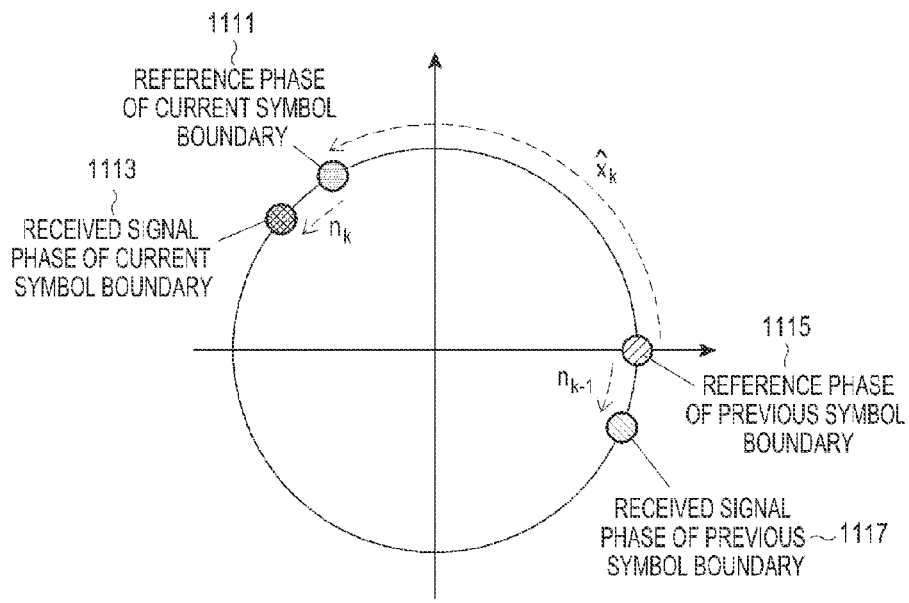
FIG. 11 illustrates a phase of a received signal when performance degradation occurs due to non-coherence modulation in a GFSK-MLSE scheme in a communication system supporting a GFSK modulation scheme according to an embodiment of the present disclosure.

FIG. 11 illustrates a phase of a received signal in consideration of performance degradation due to non-coherence modulation in a GFSK-MLSE scheme in a communication system supporting a GFSK modulation scheme according to an embodiment of the present disclosure.

A differential algorithm that a channel noise is added twice is illustrated in FIG. 11, where $n_{k-1}$ denotes a phase error due to a noise that is added to a reference phase 1115 in a previous symbol boundary, and $n_k$ denotes a phase error due to a noise that is added to a reference phase 1111 in a current symbol boundary. The phase error $n_{k-1}$ is added to the reference phase 1115 in the previous symbol boundary, and this is generated as a received signal phase 1117 of the previous symbol boundary. The phase error $n_k$ is added to the reference phase 1111 in the current symbol boundary, and this is generated as a received signal phase 1113 of the current symbol boundary.

Therefore, if the phase error $n_k$ is estimated, performance degradation due to an error of a reference phase, i.e., non-coherent demodulation, may be prevented.

In accordance with an embodiment of the present disclosure, a phase error $n_{k-1}$ of a previous symbol boundary may be estimated as shown in Equation (11), by accumulating phase errors of a previous symbol boundary in each Viterbi state.

$$\hat{n}_0 = 0, \hat{n}_k = y_k - \hat{x}_{k,s} + (1-\beta)\hat{n}_{k-1} \qquad (11)$$

Equation (11) is an example of a method of estimating an error of a reference phase, however, it will be understood by those of ordinary skill in the art that other reference phase error estimating method may be used.

A previous reference phase may be effectively detected by compensating for the phase error $n_{k-1}$ when each branch metric is calculated, and this may be expressed as shown in Equation (12).

$$\begin{aligned}\text{Branch Metric} &= |n_k| \qquad (12)\\ &\cong |y_k - \hat{x}_k + (1-\beta)\hat{n}_{k-1}|\\ &= |y_k - c_s h_{fix}\pi - \hat{f}_{\pm,k-1} + (1-\beta)\hat{n}_{k-1}|\end{aligned}$$

Figure 12:
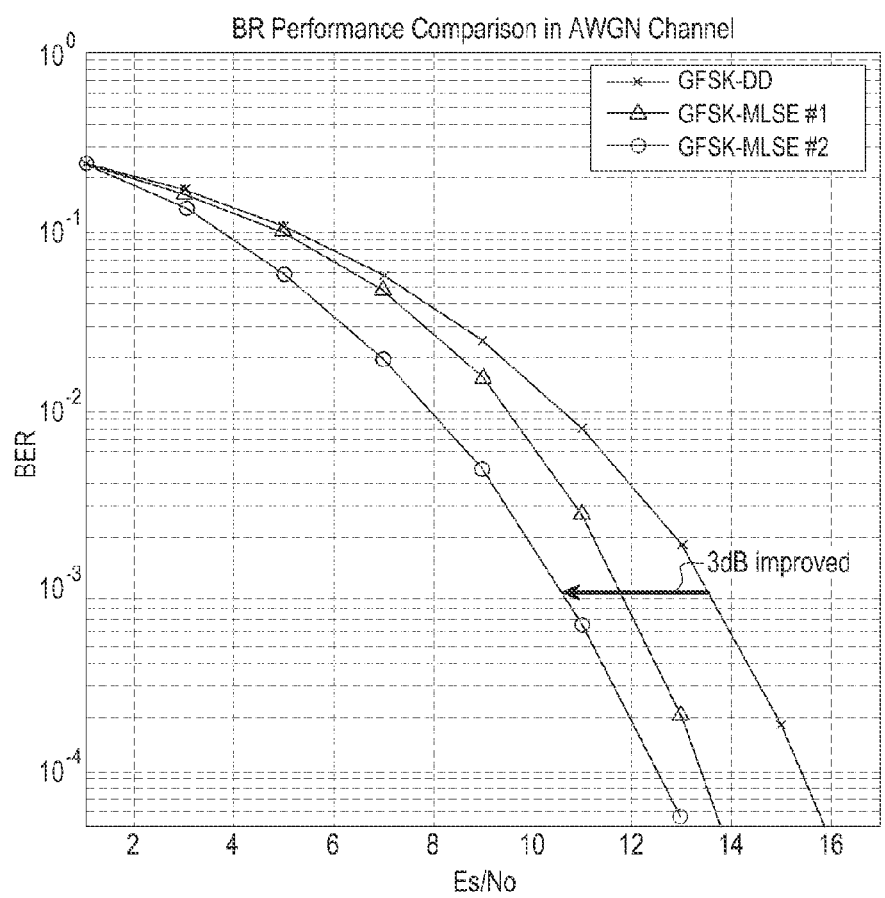
FIG. 12 illustrates performance of a basic rate (BR) in a GFSK-MLSE scheme in a communication system supporting a GFSK modulation scheme according to an embodiment of the present disclosure.

FIG. 12 illustrates a performance of a BR in a GFSK-MLSE scheme in a communication system supporting a GFSK modulation scheme according to an embodiment of the present disclosure.

In FIG. 12, it will be understood that BR performances of a GFSK-MLSE scheme according to an embodiment of the present disclosure, i.e., BR performances of a GFSK-MLSE scheme, which are illustrated as "GFSK-MLSE#1" and "GFSK-MLSE#2" in FIG. 12, are more enhanced compared to BR performances when an MLSE scheme is not used, i.e., a BR performance, which is illustrated as "GFSK-DD (differential detection)".

Referring to FIG. 12, all of the BR performance of the GFSK-MLSE scheme illustrated as "GFSK-MLSE#1" and the BR performance of the GFSK-MLSE scheme illustrated as "GFSK-MLSE#2" indicate a BR performance to which a GFSK-MLSE scheme according to an embodiment of the present disclosure is applied. The BR performance of the GFSK-MLSE scheme illustrated as "GFSK-MLSE#2" indicates a BR performance of a GFSK-MLSE scheme that a frequency offset, a modulation index offset, and an error of a previous phase are compensated. The BR performance of the GFSK-MLSE scheme illustrated as "GFSK-MLSE#1" indicates a BR performance of a GFSK-MLSE scheme that the frequency offset, the modulation index offset, and the error of the previous phase are not compensated.

Further, a vertical axis indicates a bit error rate (BER), and a horizontal axis indicates Es/No. It will be noted that the BR performance in FIG. 12 is a BR performance when an AWGN channel is assumed.

Figure 13:
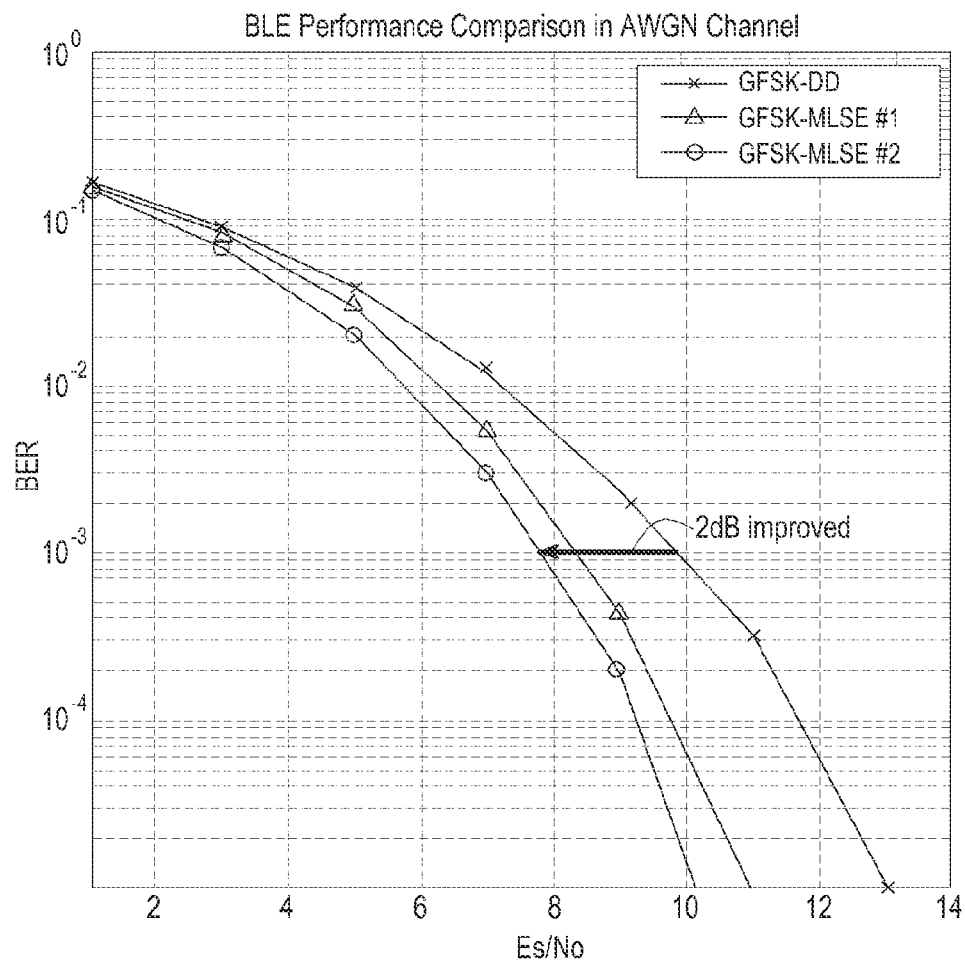
FIG. 13 illustrates a performance of Bluetooth® low energy (BLE) in GFSK-MLSE scheme in a communication system supporting a GFSK modulation scheme according to an embodiment of the present disclosure.

FIG. 13 illustrates a performance of a BLE in a GFSK-MLSE scheme in a communication system supporting a GFSK modulation scheme according to an embodiment of the present disclosure.

As illustrated in FIG. 13, BLE performances of a GFSK-MLSE scheme according to an embodiment of the present disclosure, i.e., BLE performances of a GFSK-MLSE scheme, which are illustrated as "GFSK-MLSE#1" and "GFSK-MLSE#2" in FIG. 13 are more enhanced, compared to BLE performances when an MLSE scheme is not used, i.e., a BR performance, which is illustrated as "GFSK-DD".

Referring to FIG. 13, all of the BLE performance of the GFSK-MLSE scheme illustrated as "GFSK-MLSE#1" and the BLE performance of the GFSK-MLSE scheme illustrated as "GFSK-MLSE#2" indicate a BLE performance to which a GFSK-MLSE scheme according to an embodiment of the present disclosure is applied. The BLE performance of the GFSK-MLSE scheme illustrated as "GFSK-MLSE#2" indicates a BLE performance of a GFSK-MLSE scheme that a frequency offset, a modulation index offset, and an error of a previous phase are compensated. The BLE performance of the GFSK-MLSE scheme illustrated as "GFSK-MLSE#1" indicates a BLE performance of a GFSK-MLSE scheme that the frequency offset, the modulation index offset, and the error of the previous phase are not compensated.

Further, a vertical axis indicates a BER, and a horizontal axis indicates Es/No. The BLE performance in FIG. 13 is a BLE performance when an AWGN channel is assumed.

Figure 14:
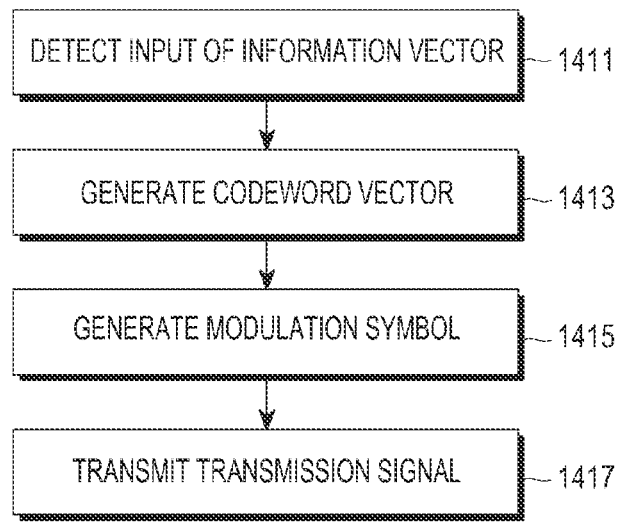
FIG. 14 is a flow chart illustrating an operating process of a signal transmitting apparatus in a communication system supporting a GFSK modulation scheme according to an embodiment of the present disclosure.

FIG. 14 is a flow chart illustrating an operating process of a signal transmitting apparatus in a communication system supporting a GFSK modulation scheme according to an embodiment of the present disclosure.

Referring to FIG. 14, the signal transmitting apparatus detects that an information vector is input in step 1411. In step 1413, the signal transmitting apparatus encodes the information vector based on a preset encoding scheme to generate a codeword vector. The encoding scheme, which is used in the signal transmitting apparatus, may be one of various encoding schemes, and a description of the encoding scheme will be omitted herein.

In step 1415, the signal transmitting apparatus modulates the codeword vector based on a GFSK modulation scheme, thereby generating a modulated symbol.

In step 1417, the signal transmitting apparatus performs radio frequency (RF) processing on the modulated symbol corresponding to a preset RF processing scheme, thereby generating and transmitting a transmission signal. The RF processing scheme, which is used in the signal transmitting apparatus, may be one of various RF processing schemes, and a description of the RF processing scheme will be omitted herein.

Although not illustrated in FIG. 14, the signal transmitting apparatus may additionally notify the signal receiving apparatus to perform a signal detecting operation using a GFSK-MLSE scheme that compensates for a frequency offset and a modulation index offset or to perform a signal detecting operation using a GFSK-MLSE scheme that does not compensate for a frequency offset and a modulation index offset.

Although the signal transmitting apparatus may not notify the signal receiving apparatus, the signal receiving apparatus may still perform a signal detecting operation using the GFSK-MLSE scheme that compensates for the frequency offset and the modulation index offset or the GFSK-MLSE scheme that does not compensate for the frequency offset and the modulation index offset, if necessary or as a preset form.

Although FIG. 14 illustrates an operating process of a signal transmitting apparatus in a communication system supporting a GFSK modulation scheme according to an embodiment of the present disclosure, various changes could be made to FIG. 14. For example, although shown as a series of operations, various operations in FIG. 14 could overlap, occur in parallel, occur in a different order, or occur multiple times.

Figure 15:
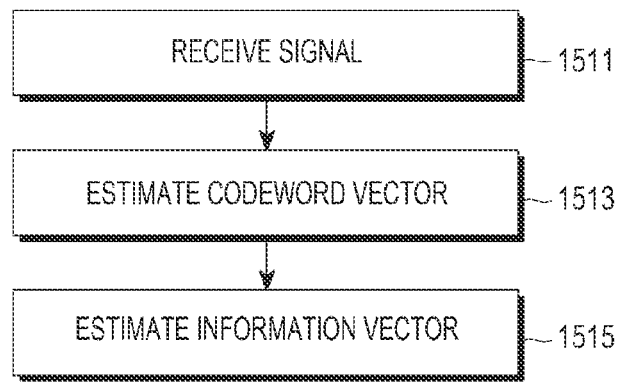
FIG. 15 is a flow chart illustrating an operating process of a signal receiving apparatus in a communication system supporting a GFSK modulation scheme according to an embodiment of the present disclosure.

FIG. 15 is a flow chart illustrating an operating process of a signal receiving apparatus in a communication system supporting a GFSK modulation scheme according to an embodiment of the present disclosure.

Referring to FIG. 15, in step 1511, the signal receiving apparatus receives a signal from a signal transmitting apparatus, and performs a RF processing, which corresponds to an RF processing scheme used in a signal transmitting apparatus, on the received signal, thereby generating an RF processed signal. In step 1513, the signal receiving apparatus performs a signal detecting operation, which is based on an MLSE scheme, to estimate a codeword vector. In step 1515, the signal receiving apparatus performs a decoding operation on the estimated codeword vector, based on a decoding scheme, which corresponds to an encoding scheme that was used in the signal transmitting apparatus, to estimate an information vector.

Although FIG. 15 illustrates an operating process of a signal receiving apparatus in a communication system supporting a GFSK modulation scheme according to an embodiment of the present disclosure, various changes could be made to FIG. 15. For example, although shown as a series of operations, various operations in FIG. 15 could overlap, occur in parallel, occur in a different order, or occur multiple times.

Figure 16:
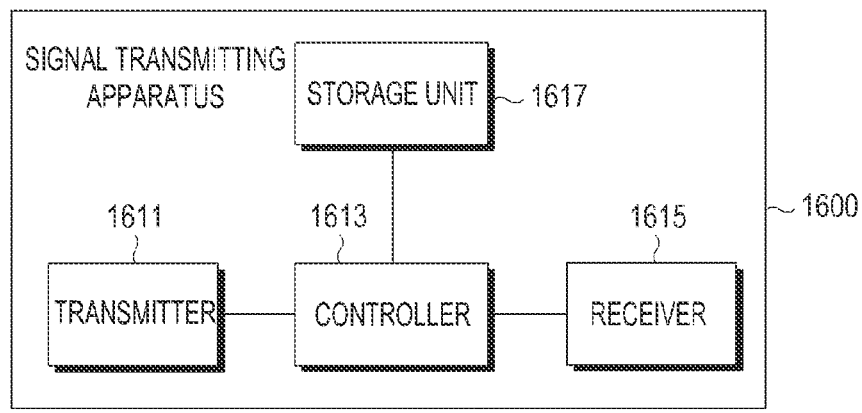
FIG. 16 illustrates a signal transmitting apparatus in a communication system supporting a GFSK modulation scheme according to an embodiment of the present disclosure.

FIG. 16 illustrates a signal transmitting apparatus in a communication system supporting a GFSK modulation scheme according to an embodiment of the present disclosure.

Referring to FIG. 16, a signal transmitting apparatus 1600 includes a transmitter 1611, a controller 1613, a receiver 1615, and a storage unit 1617.

The controller 1613 controls the overall operation of the signal transmitting apparatus 1600. More particularly, the controller 1613 controls the signal transmitting apparatus 1600 to perform an operation related to a signal transmitting operation according to any of the above-described embodiments of the present disclosure. The operation related to the signal transmitting operation is performed in the manner described with reference to FIG. 14, and an additional description thereof will be omitted herein.

The transmitter 1611 transmits various signals, various messages, etc., a signal receiving apparatus, under a control of the controller 1613. The various signals, the various messages, etc., transmitted in the transmitter 1611 have been described in FIG. 14, and an additional description thereof will be omitted herein.

The receiver 1615 receives various signals, various messages, etc., from the signal receiving apparatus, and the like under a control of the controller 1613. The various signals, the various messages, etc., received in the receiver 1615 have been described in FIG. 14, and an additional description thereof will be omitted herein.

The storage unit 1617 stores a program and various data necessary for the operation of the signal transmitting apparatus 1600, information related to the signal transmitting operation, etc. The storage unit 1617 stores the various signals, the various messages, etc., received in the receiver 1615.

While the transmitter 1611, the controller 1613, the receiver 1615, and the storage unit 1617 are illustrated as separate devices or processors, this is merely for convenience of description. In other words, two or more of the transmitter 1611, the controller 1613, the receiver 1615, and the storage unit 1617 may be incorporated into a single device or processor.

Figure 17:
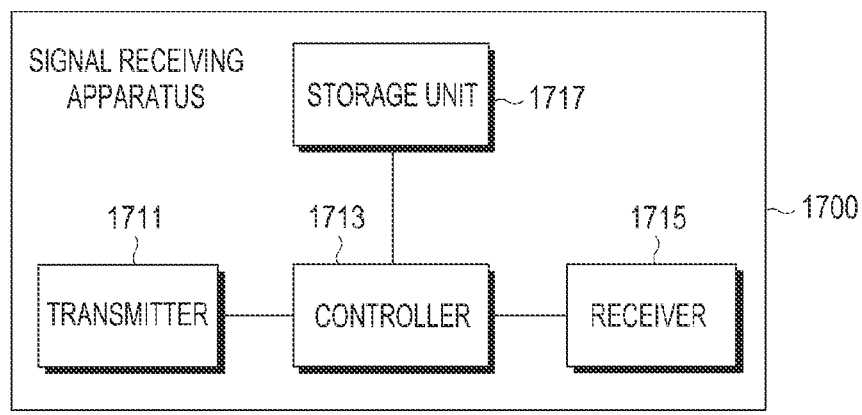
FIG. 17 illustrates a signal receiving apparatus in a communication system supporting a GFSK modulation scheme according to an embodiment of the present disclosure.

FIG. 17 illustrates a signal receiving apparatus in a communication system supporting a GFSK modulation scheme according to an embodiment of the present disclosure.

Referring to FIG. 17, a signal receiving apparatus 1700 includes a transmitter 1711, a controller 1713, a receiver 1715, and a storage unit 1717.

The controller 1713 controls the overall operation of the signal receiving apparatus 1700. More particularly, the controller 1713 controls the signal receiving apparatus 1700 to perform an operation related to a signal receiving operation in a GFSK-MLSE scheme according to any of the above-described embodiments of the present disclosure. The operation related to the signal receiving operation in GFSK-MLSE scheme is performed in the manner described with reference to FIGS. 4 to 13, and 15, and an additional description thereof will be omitted herein.

The transmitter 1711 transmits various signals, various messages, etc., to a signal transmitting apparatus, etc., under a control of the controller 1713. The various signals, the various messages, and the like transmitted in the transmitter 1711 have been described in FIGS. 4 to 13, and 15, and an additional description thereof will be omitted herein.

The receiver 1715 receives various signals, various messages, and the like from the signal transmitting apparatus, etc., under a control of the controller 1713. The various signals, the various messages, etc., received in the receiver 1715, have been described in FIGS. 4 to 13, and 15, and an additional description thereof will be omitted herein.

The storage unit 1717 stores a program and various data necessary for the operation of the signal receiving apparatus 1700, information related to the operation related to the signal receiving operation in the case that the GFSK-MLSE scheme is used, etc. The storage unit 1717 stores the various signals, the various messages, etc., received in the receiver 1715.

While the transmitter 1711, the controller 1713, the receiver 1715, and the storage unit 1717 are illustrated as separate devices or processors, it is to be understood that this is merely for convenience of description. In other words, two or more of the transmitter 1711, the controller 1713, the receiver 1715, and the storage unit 1717 may be incorporated into a single device or processor.

As is apparent from the foregoing description, the various embodiments of the present disclosure enable signal reception based on a GSFK-MLSE scheme, which is based on a GFSK modulation scheme and an MLSE scheme, in a communication system supporting the GFSK modulation scheme.

An embodiment of the present disclosure enables signal reception based on a GSFK-MLSE scheme, thereby decreasing processing complexity in a communication system supporting a GFSK modulation scheme.

An embodiment of the present disclosure enables signal reception based on a GSFK-MLSE scheme, thereby decreasing implementation complexity in a communication system supporting a GFSK modulation scheme.

An embodiment of the present disclosure enables signal reception based on a GSFK-MLSE scheme, thereby compensating for a frequency offset in a communication system supporting a GFSK modulation scheme.

An embodiment of the present disclosure enables signal reception based on a GSFK-MLSE scheme, thereby compensating for a modulation index offset in a communication system supporting a GFSK modulation scheme.

An embodiment of the present disclosure enables signal reception based on a GSFK-MLSE scheme, thereby enhancing an error estimation performance in a communication system supporting a GFSK modulation scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that some methods and apparatuses according to embodiments of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method for receiving a signal by an signal receiving apparatus in a communication system supporting a Gaussian frequency shift keying (GFSK) modulation scheme, the method comprising:
   receiving, by the signal receiving apparatus, the signal from a signal transmitting apparatus; and
   estimating, by the signal receiving apparatus, a codeword vector of the received signal by performing a signal detecting operation based on a GFSK-maximum likelihood sequence estimation (MLSE) scheme, which is based on a GFSK modulation scheme and an MLSE scheme, on the received signal,
      wherein states of a Viterbi trellis that are used in the GFSK-MLSE scheme are determined based on the GFSK modulation scheme,
         wherein performing the signal detecting operation comprises compensating for a frequency offset and a modulation index offset from a modulation index that is used in the GFSK scheme to estimate the codeword vector,
         wherein compensating for the frequency offset and the modulation index offset comprises:
            updating a negative offset estimation value or determining a branch metric based on a negative offset estimation value for states in which a negative phase difference occurs, which are used in the GFSK-MLSE scheme; and
            updating a positive offset estimation value or determining a branch metric based on a positive offset estimation value for states in which a positive phase difference occurs, which are used in the GFSK-MLSE scheme.

2. The method of claim 1,
   wherein the negative offset estimation value denotes an estimation value of a difference between a frequency offset and a modulation index offset of a state in which negative phase difference occurs, and
   wherein the positive offset estimation value denotes an estimation value of a sum of a frequency offset and a modulation index offset of a state in which a positive phase difference occurs.

3. The method of claim 1, wherein updating the negative offset estimation value comprises updating the negative offset estimation value based on a receiving phase deviation for the received signal, an estimated transmitting phase deviation, and a negative offset estimation value of a symbol received prior to a current symbol.

4. The method of claim 3, wherein the estimated transmitting phase deviation is determined based on a constant that is dependent on inter-symbol interference (ISI), a nominal fixed modulation index, the modulation index offset, and the frequency offset.

5. The method of claim 1, wherein updating the positive offset estimation value comprises updating the positive offset estimation value based on a receiving phase deviation for the received signal, an estimated transmitting phase deviation, and a positive offset estimation value of a symbol received prior to a current symbol.

6. The method of claim 5, wherein the estimated transmitting phase deviation is determined based on a constant that is dependent on inter-symbol interference (ISI), a nominal fixed modulation index, the modulation index offset, and the frequency offset.

7. The method of claim 1, wherein compensating for the frequency offset and the modulation index offset comprises estimating a phase error of a previous symbol, based on a phase error of a current symbol, in each state of the Viterbi trellis.

8. The method of claim 7, wherein compensating for the frequency offset and the modulation index offset further comprises compensating for the phase error of the estimated previous symbol to detect a reference phase of the previous symbol.

9. The method of claim 8, wherein compensating for the phase error of the estimated previous symbol comprises determining a branch metric based on the estimated phase error of the previous symbol and one of the received signal, a constant that is dependent on inter-symbol interference (ISI), a nominal fixed modulation index, a positive offset estimation value, and a negative offset estimation value,
   wherein the negative offset estimation value denotes an estimation value of a difference between a frequency offset and a modulation index offset of a state in which a negative phase difference occurs, and
   wherein the positive offset estimation value denotes an estimation value of a sum of a frequency offset and a modulation index offset of a state in which a positive phase difference occurs.

10. A signal receiving apparatus in a communication system supporting a Gaussian frequency shift keying (GFSK) modulation scheme, the signal receiving apparatus comprising:
   a receiver configured to receive a signal from a signal transmitting apparatus, and
   a controller configured to estimate a codeword vector of the received signal by performing a signal detecting operation based on a GFSK-maximum likelihood sequence estimation (MLSE) scheme, which is based on a GFSK modulation scheme and an MLSE scheme, on the received signal,
      wherein states of a Viterbi trellis that are used in the GFSK-MLSE scheme are determined based on the GFSK modulation scheme,
         wherein performing the signal detecting operation comprises compensating for a frequency offset and a modulation index offset from a modulation index that is used in the GFSK scheme to estimate the codeword vector,
         wherein compensating for the frequency offset and the modulation index offset comprises:
            updating a negative offset estimation value or determining a branch metric based on a negative offset estimation value for states in which a negative phase difference occurs, which are used in the GFSK-MLSE scheme; and updating a positive offset estimation value or determining a branch metric based on a positive offset estimation value for states in which a positive phase difference occurs, which are used in the GFSK-MLSE scheme.

11. The apparatus of claim 10,
wherein the negative offset estimation value denotes an estimation value of a difference between a frequency offset and a modulation index offset of a state in which a negative phase difference occurs, and
wherein the positive offset estimation value denotes an estimation value of a sum of a frequency offset and a modulation index offset of a state in which a positive phase difference occurs.

12. The apparatus of claim 10, wherein updating the negative offset estimation value comprises updating the negative offset estimation value based on a receiving phase deviation for the received signal, an estimated transmitting phase deviation, and a negative offset estimation value of a symbol received prior to a current symbol.

13. The apparatus of claim 12, wherein the estimated transmitting phase deviation is determined based on a constant that is dependent on inter-symbol interference (ISI), a nominal fixed modulation index, the modulation index offset, and the frequency offset.

* * * * *